US009571185B2

United States Patent
Reial et al.

(10) Patent No.: US 9,571,185 B2
(45) Date of Patent: Feb. 14, 2017

(54) ROBUST, FAST UNUSED-CODE DETECTION

(71) Applicant: Telefonaktiebolaget L M Ericsson (publ), Stockholm (SE)

(72) Inventors: Andres Reial, Malmö (SE); Elias Jonsson, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 54 days.

(21) Appl. No.: 13/897,832

(22) Filed: May 20, 2013

(65) Prior Publication Data
US 2014/0341260 A1 Nov. 20, 2014

(51) Int. Cl.
*H04B 1/00* (2006.01)
*H04B 7/26* (2006.01)
*H04B 1/7073* (2011.01)

(52) U.S. Cl.
CPC ........ *H04B 7/2628* (2013.01); *H04B 1/70735* (2013.01)

(58) Field of Classification Search
CPC .................... H04B 1/709; H04B 1/712; H04B 2201/709727
USPC .......................... 375/144, 148, 149, 343, 346
See application file for complete search history.

(56) References Cited

U.S. PATENT DOCUMENTS

| | | | |
|---|---|---|---|
| 6,859,488 B2 * | 2/2005 | Azenkot et al. | 375/147 |
| 7,848,387 B2 * | 12/2010 | Jonsson et al. | 375/144 |
| 2004/0091034 A1 | 5/2004 | Shiu et al. | |
| 2007/0116158 A1 * | 5/2007 | Guo | H04L 27/0014 375/343 |
| 2008/0009295 A1 * | 1/2008 | Brousseau | H04W 64/00 455/456.1 |
| 2008/0130719 A1 * | 6/2008 | Bottomley et al. | 375/148 |
| 2008/0304554 A1 * | 12/2008 | Fulghum et al. | 375/149 |
| 2009/0023437 A1 * | 1/2009 | Cairns et al. | 455/422.1 |
| 2012/0082197 A1 * | 4/2012 | Jonsson et al. | 375/224 |
| 2013/0039392 A1 * | 2/2013 | Chu | G01S 19/246 375/150 |

FOREIGN PATENT DOCUMENTS

WO 2012096600 A1 7/2012

* cited by examiner

*Primary Examiner* — Hirdepal Singh
*Assistant Examiner* — Sung Ahn
(74) *Attorney, Agent, or Firm* — Murphy, Bilak & Homiller, PLLC (57) ABSTRACT

Techniques for processing a received multi-code code-division multiple-access (CDMA) signal to detect unused spreading codes are disclosed. An example method includes, for each of a plurality of observation time intervals and for each of one or more candidate spreading codes, determining a detection threshold for use in detecting whether the candidate spreading code is unused in the received multi-code CDMA signal, based on a target detection sensitivity and at least one of an estimate of received signal quality and an estimate of channel estimation quality. Estimated signal power for the candidate spreading code is compared to estimated noise and interference power corresponding to a spreading code that is known to be unused or corresponding to a spreading code that carries known symbol values, using the calculated detection threshold. Whether or not the candidate spreading code is unused is then determined, based on the comparison.

22 Claims, 6 Drawing Sheets

ROBUST, FAST UNUSED-CODE DETECTION

TECHNICAL FIELD

The present disclosure generally relates to wireless receivers, and particularly relates to techniques for estimating impairments to received signals for interference suppression purposes.

BACKGROUND

RAKE receivers are well known in the communication arts and find wide-spread use in Code Division Multiple Access (CDMA) systems, such as in IS-95, IS-2000 (cdma2000), Wideband CDMA (WCDMA), and High Speed Packet Access (HSPA) wireless communication networks. The name derives from the rake-like appearance of some representations of these receivers, wherein multiple, parallel receiver "fingers" corresponding to different signal delays are used to receive multiple signal images in a received multipath signal. By coherently combining the finger outputs in a RAKE combiner, the conventional RAKE receiver can use multipath reception to improve the Signal-to-Noise Ratio (SNR) of the received multipath signal.

However, as is known to those skilled in the art, the conventional RAKE receiver is optimal only in certain limited circumstances. For example, the presence of self-interference and multi-user access interference both degrade the performance of the conventional RAKE receiver. To that end, the assignee of the instant application has made application for several patents relating to the use of a "generalized" RAKE receiver (GRAKE) architecture, wherein receiver performance is improved by increasing the sophistication of combining weight generation.

In the GRAKE architecture, the combining weight calculations consider correlations of one or more signal impairments across RAKE fingers. For example, a GRAKE receiver may track noise correlations across those fingers. Generalized RAKE receivers also may include a comparatively larger number of fingers, such that extra fingers may be positioned off of the signal path delays. Indeed, a generalized RAKE receiver can gain performance improvements by shifting these extra fingers to optimize the signal-to-noise ratio (SNR) or signal-to-interference-plus-noise ratio (SINR) of the received signal. Correlations of signal impairments can also be used in SNR or SINR estimation. SINR estimation is used in power control as well as in monitoring link quality and rate adaptation.

By using its knowledge of how selected signal impairments are correlated across fingers, the GRAKE receiver can compensate the finger combining weights such that interference is suppressed and receiver performance is improved. Of course, the need to determine signal impairment correlations with sufficient accuracy and rapidity stands as a primary challenge associated with implementation of the GRAKE receiver. Example techniques for estimating impairment covariance in a GRAKE receiver are described in U.S. Pat. No. 7,848,387, titled "Receiver parametric covariance estimation for transmit diversity" and issued 7 Dec. 2010, the entire contents of which are incorporated herein by reference.

As can be seen in the aforementioned patent, practical symbol-level equalization and interference suppression techniques implemented in the GRAKE receiver utilize maximum-likelihood (ML) combining weights. These ML combining weights, $w_{ML}$, are based on statistical estimates of impairments to the received signal, as represented in an impairment covariance matrix $R_u$, and a channel estimate vector h, as follows:

$$w_{ML} = \hat{R}_u^{-1} \hat{h}. \quad (1)$$

Traditionally, one of the main challenges in improving GRAKE performance has been providing impairment covariance estimates with a sufficient quality. The mainstream approach to estimation has been to use pilot symbols with known contents. With this approach, the pilot symbols are de-spread, the known symbol values are subtracted from the de-spread pilot symbols, the remaining residuals are correlated, and the correlation results are averaged over the observation interval. Unfortunately, the estimation quality is limited by the number of available pilot symbols. For example, with the Common Pilot Channel (CPICH) available in the Universal Mobile Telecommunications System (UMTS), only ten symbols per 0.667-second slot are available. As a result, smoothing or filtering over multiple slots needs to be applied to obtain an acceptable variance of the noise estimation. Such smoothing is undesirable when the propagation channel or the interference environment changes from one transmission-time interval (TTI) to another.

One way around the problem of insufficient pilot symbols is to use MMSE weight construction:

$$w_{MMSE} = \hat{R}_d^{-1} \hat{h}, \quad (2)$$

where the data covariance $R_d = R_u + hh^H$ is estimated from data symbols with unknown contents, of which there are plenty. Unfortunately, due to the presence of the rank-1 term $hh^H$, the data covariance $R_d$ becomes poorly conditioned at high signal-to-interference-plus-noise ratios (SINRs), and the MMSE weights are significantly more sensitive to channel estimation errors at high SINR. In practice, MMSE weights do not provide acceptable performance at high SINR and at medium-to-high speeds, where channel estimate smoothing is limited.

Unused codes, e.g., free nodes in the Orthogonal Variable Spreading Factor (OVSF) code tree, and codes with known contents (e.g., certain control channels) have each been included in the covariance estimation symbol pool, in some estimation techniques. (If a code is known to be unused, then symbols de-spread from the received signal using include no data at all, which means that the de-spread symbols contain only the results of impairments. Thus, a known unused code can be regarded as providing the equivalent of known pilot symbols.) When around 120-150 symbols from such codes may be identified, the impairment covariance estimation quality starts to approach "genie" levels. In other words, the estimation quality approaches levels that result in interference suppression and/or equalization that is indistinguishable from that realized with perfect estimates of the impairment covariance.

In a UMTS system, between twenty and 60 symbols per slot can usually be obtained from the High-Speed Shared Control Channel (HS-SCCH) codes, which have a spreading factor of 128. If it were possible to detect just one unused High-Speed Physical Downlink Shared Channel, which has a spreading factor of 16, then the equivalent of 160 symbols would be available per slot, virtually guaranteeing a high-quality impairment covariance estimate. While the normal full-buffer scheduling strategy at a High-Speed Packet Access (HSPA) base station is to attempt to allocate as many High-Speed Physical Downlink Shared Channel (HS- PDSCH) codes as possible, i.e., to avoid leaving unused codes, there are numerous practical scenarios that do result in empty codes.

One approach to detecting unused HS-PDSCH codes is based on evaluating long-term signal power and interference power estimates. However, this approach requires long observation intervals for sufficient robustness, so it is viable only in scenarios where the code allocation patterns do not change, such as in test scenarios. In real network deployments, HS-PDSCH code allocations can change on a per-TTI basis. As a result, the determination of whether a code is used or not must be made at the same time scale.

To enable opportunistic utilization of unused codes to maximize equalization performance, it is therefore desirable to develop techniques for fast, TTI-based unused code detection, with a high-degree of decision robustness.

SUMMARY

Impairment covariance estimation quality in wireless receivers is improved if more symbols with known data contents (or more symbols known to include no data) are used in the estimation process. One way to increase the number of available symbols is to de-spread symbols that correspond to unused OVSF codes. Since the code allocation over the entire code tree is unknown to the UE and changes frequently, it is desirable to be able to identify available unused codes rapidly, on a TTI basis. This must be done robustly, avoiding unused code false decisions.

Currently known unused HS-PDSCH code detection techniques require long observation intervals for sufficient robustness, and are thus generally viable only in test scenarios, where code allocation patterns are static. In live networks, however, HS-PDSCH code allocations can change on a per-TTI basis. Several embodiments of the techniques detailed below are able to detect unused codes using observations from only a single TTI.

More particularly, techniques for processing a received multi-code code-division multiple-access (CDMA) signal to detect unused spreading codes are detailed below. An example method includes, for each of a plurality of observation time intervals and for each of one or more candidate spreading codes, determining a detection threshold for use in detecting whether the candidate spreading code is unused in the received multi-code CDMA signal, based on a target detection sensitivity and at least one of an estimate of received signal quality and an estimate of channel estimation quality. Estimated signal power for the candidate spreading code is compared to estimated noise and interference power corresponding to a spreading code that is known to be unused or corresponding to a spreading code that carries known symbol values, using the calculated detection threshold. Whether or not the candidate spreading code is unused is then detected, based on the comparison.

In a variant of this approach, the detection threshold is predetermined. In embodiments according this variant, an achievable performance level for detecting whether a candidate spreading code is unused in the received multi-code CDMA signal is determined, based on the predetermined detection threshold and an estimate of received signal quality for the current observation time interval. The estimated achievable performance level is compared to a predetermined performance level to determine whether the estimated achievable performance level is better than the predetermined performance level. In response to determining that the estimated achievable performance level is better than the predetermined performance level, an estimated signal power for the candidate spreading code is compared to estimated noise and interference power corresponding to a spreading code that is known to be unused or corresponding to a spreading code that carries known symbol values, using the calculated detection threshold. Whether the candidate spreading code is unused is then detected, based on said comparing.

In any of the embodiments summarized above, one or more of the spreading codes that are determined to be unused may be used to estimate impairment covariance statistics, using noise and interference measurements corresponding to the unused candidate spreading codes. The estimated impairment covariance statistics can be used to perform equalization of the received multi-code CDMA signal, or to perform interference suppression with respect to the received multi-code CDMA signal, or both.

Other embodiments of the presently disclosed techniques include wireless receiver circuits adapted to carry out one or more of the methods summarized above, or any of the variant techniques detailed below. Still further embodiments include wireless devices, such as user equipments (UEs), smartphones, or wireless-enabled tablet computers, comprising such a receiver circuit. Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
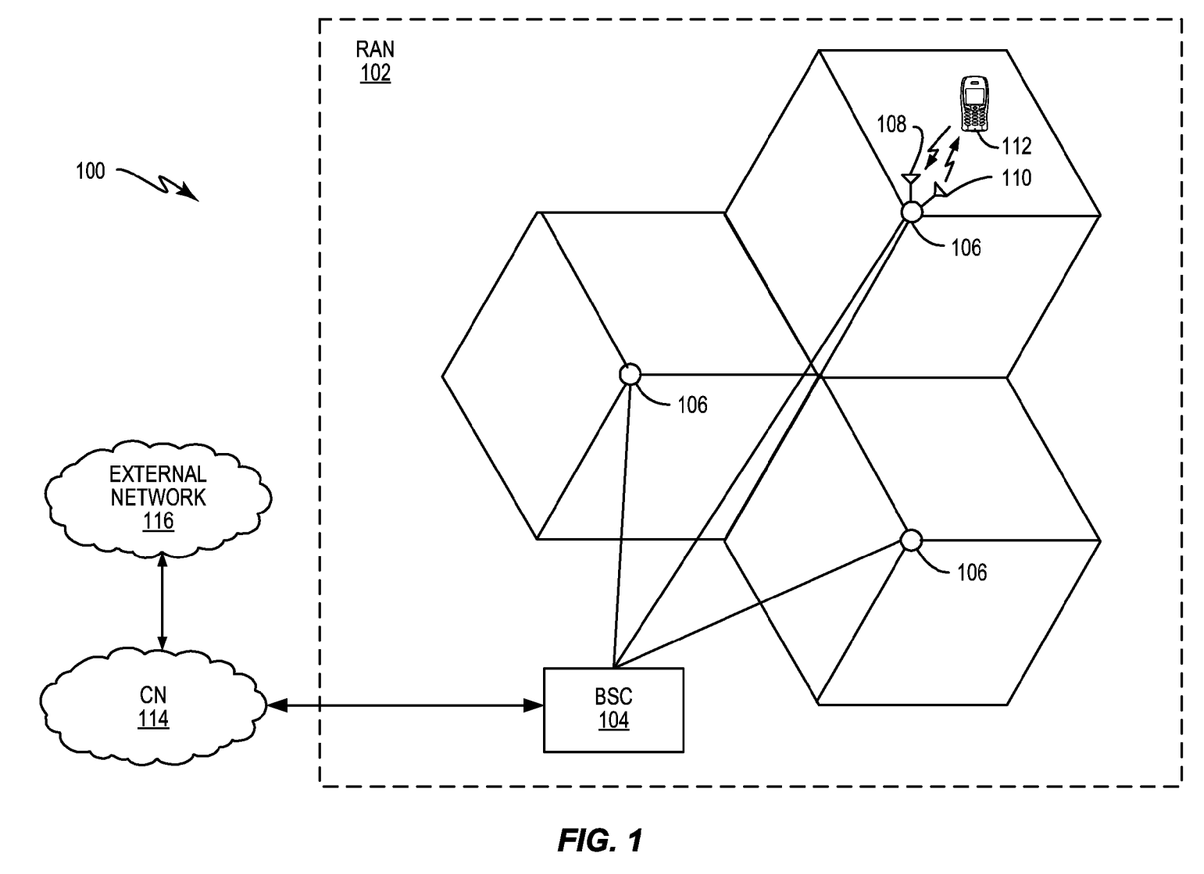
FIG. 1 is a block diagram of a wireless communication system.

FIG. 1 depicts an example wireless communication system 100. Within a Radio Access Network (RAN) 102, a Base Station Controller (BSC) 104 controls a plurality of Radio Base Stations (RBS) 106, also known in the art as Base Transceiver Stations (BTS). The BSC 104 and an RBS 106 together comprise a "base station" or "NodeB". Each base station provides radio communication services with subscriber mobile terminals or user equipments (UEs) 112 within a geographic area called a cell. Each cell may be divided into sectors, as depicted in FIG. 1. The BSC 104 communicates with a Core Network (CN) 114, which in turn is connected to one or more external networks 116, such as the Public Switched Telephone Network (PSTN), the Internet, or the like.

In addition to an information signal, the base station transmits a pilot channel from each transmit antenna 108, 110, in this example of a system employing transmit diversity. The pilot channels comprise a series of pilot symbols. For the primary transmit antenna 108, a sequence of QPSK pilot symbols are transmitted using a linked-256 Walsh code that is scrambled by a specific long code. In the WCDMA standard, the pilot symbols take on the same value, $(\pm 1 \pm j)/\sqrt{2}$. The sample may be treated as purely real or purely imaginary, as described in U.S. Pat. No. 6,005,887, titled "De-spreading of Direct Sequence Spread Spectrum Communication Signals" and issued 21 Dec. 1999, the entire contents of which are incorporated herein by reference in its entirety.

Figure 2:
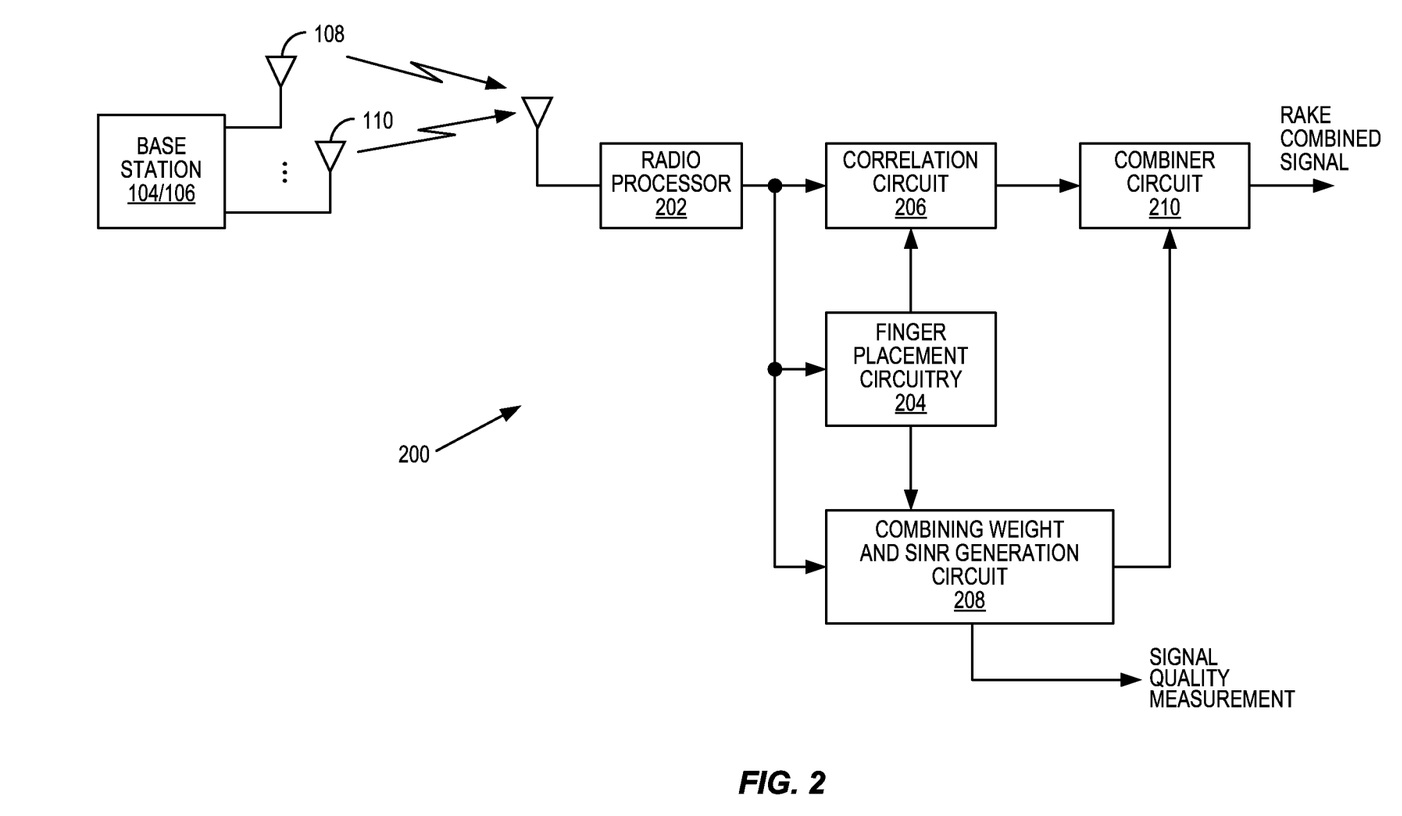
FIG. 2 is a block diagram of a symbol-level linear interference-whitening (LIW) receiver in transmit diversity.

The GRAKE receiver is an example of one of two main types of linear interference-whitening (LIW) receiver architectures. The GRAKE receiver uses symbol-level equalization, an example of which is shown in FIG. 2, and typically uses maximum likelihood (ML) estimation. As seen in FIG. 2, GRAKE receiver 200 includes a radio processor 202, which generates chip samples from a received information signal transmitted by primary and secondary antennas 108, 110 at the base station. The chip samples are provided to a finger placement circuit 204, which determines the "finger delays," usually including multipath delays, which are then used to de-spread a received signal in a correlation unit 206. The finger delays are also provided to a weight computer 208, which computes combining weights that are used to combine the de-spread values in a combiner 210 to produce soft values. It will be appreciated that only those features of GRAKE receiver 200 that are necessary for a complete understanding of the presently disclosed techniques are illustrated in FIG. 2. Other details, such as the details of the radio front-end circuitry in radio processor 202, are well known and are not reproduced here. Furthermore, it should be understood that the GRAKE receiver details provided herein are for purposes of explanation only, and are not intended to imply that the techniques described herein are limited to such receivers. GRAKE receiver configurations that differ from those disclosed herein and other receiver types, including other RAKE receiver types and hybrid chip-equalizer receiver structures, can make use of an unused code for impairment covariance estimation as detailed below, and may thus be adapted according to one or more of the techniques described herein.

LIW receivers in general, and GRAKE receiver 200 in particular, rely on an estimate of a covariance matrix. In the case of maximum likelihood (ML) processing, as typically used in the GRAKE receiver, the covariance matrix is an impairment covariance matrix. As noted above, the need to estimate signal impairments with sufficient accuracy and rapidity stands as a primary challenge associated with implementation of the GRAKE receiver. The ML combining weights used in the GRAKE are based on statistical estimates of impairments to the received signal, as represented by the impairment covariance matrix $R_u$, and an estimate of the channel vector h, as follows:

$$w_{ML} = \hat{R}_u^{-1} \hat{h}. \quad (3)$$

As discussed above, the mainstream approach to estimation has been to use pilot symbols with known contents. With this approach, the pilot symbols are de-spread, the known symbol values are subtracted from the de-spread pilot symbols, the remaining residuals are correlated, and the correlation results are averaged over the observation interval. Unfortunately, the estimation quality is limited by the number of available pilot symbols. For example, with the Common Pilot Channel (CPICH) available in the Universal Mobile Telecommunications System (UMTS), only ten symbols per 0.667-second slot are available. As a result, smoothing or filtering over multiple slots needs to be applied to obtain an acceptable variance of the noise estimation. Such smoothing is of course undesirable when the propagation channel or the interference environment changes from one transmission-time interval (TTI) to another.

As noted above, unused codes, e.g., free nodes in the Orthogonal Variable Spreading Factor (OVSF) code tree have been included in the covariance estimation symbol pool, in some estimation techniques. If a code is known to be unused, then symbols de-spread from the received signal include no data at all, which means that the de-spread symbols contain only the results of impairments. Thus, a known unused code can be regarded as providing the equivalent of known pilot symbols. When around 120-150 symbols from such codes may be identified, the impairment covariance estimation quality starts to approach "genie" levels.

One problem with unused code detection is that its reliability decreases at low signal powers. Once the symbol SINR is below a certain threshold, it is not possible to reliably distinguish a used code from an unused one. However, since this occurs at very low per-code signal levels, the power of the hidden data component will be relatively weak, compared to the impairment component. While detecting and utilizing unused codes when they are available makes possible significant equalization performance improvement, erroneously invoking a code that is in fact used may cause significant performance degradation. The combining weight quality degrades most notably when the condition number of $R_d$ is large and the channel estimation error variance is high, since the estimation error is amplified by the large terms in the resulting $R_d^{-1}$. Therefore, even if a low-power used code is erroneously invoked in impairment covariance estimation (false alarm), and the resulting covariance estimate inadvertently becomes a (partial) data covariance estimate, the adverse impact of the rank-1 term $Shh^H$ is not significant, since the unintentionally formed data covariance matrix $R_d = R_u + Shh^H$ is dominated by $R_u$, and remains well-conditioned. Similarly, the adverse impact of the rank-1 term is smaller (possibly insignificant) if the channel estimation error is small.

In several of the techniques detailed below, the maximum permissible signal power in a presumed unused code is determined, based the prevailing conditions, so as to avoid excessive harm to the impairment covariance estimate in the event of a mistaken determination that a particular code is unused. An unused/used code test is then dynamically set up, based on this permissible signal power, to discriminate the required signal levels.

Figure 3:
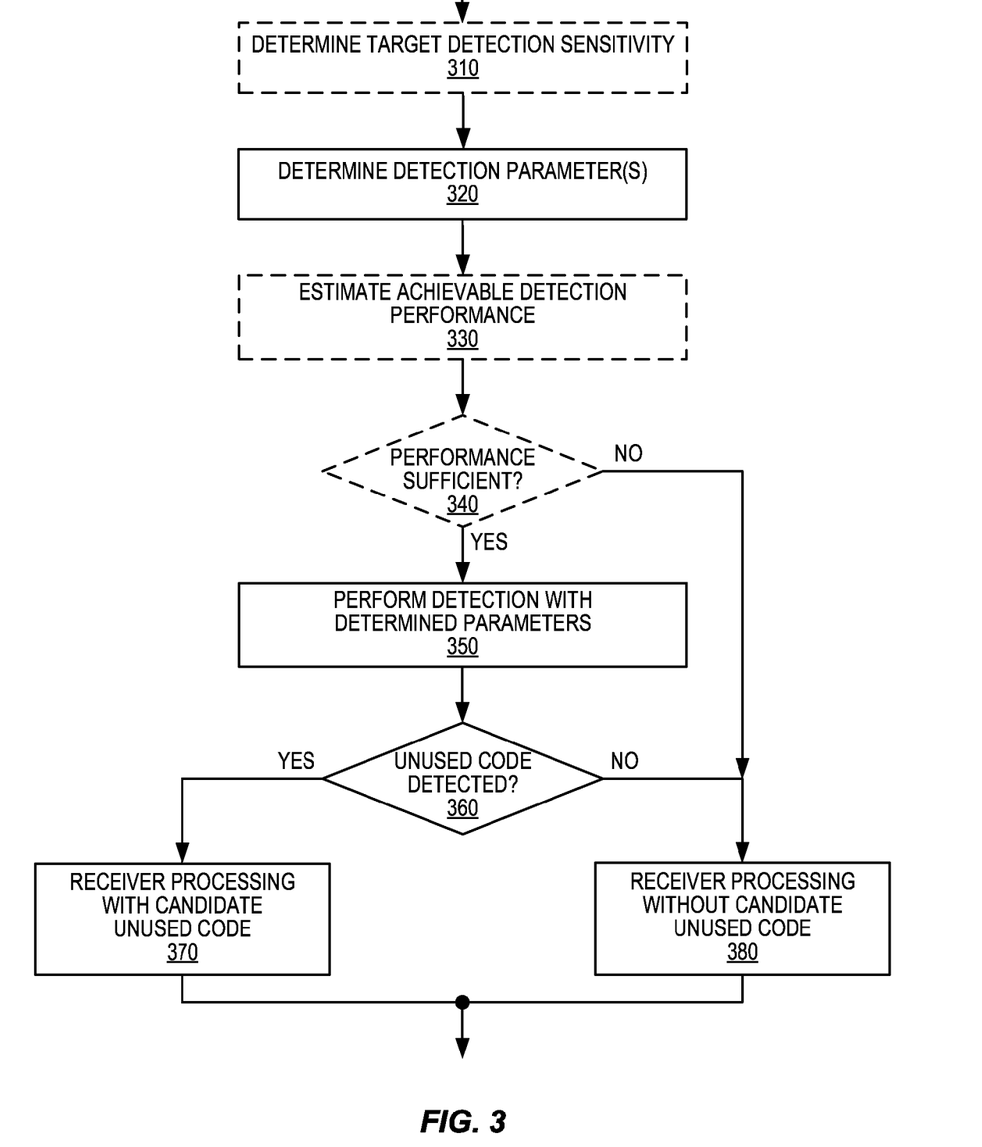
FIG. 3 is a process flow diagram illustrating an example method for processing a received multi-code code-division multiple-access (CDMA) signal to detect unused spreading codes.

A processing flow diagram illustrating operations taken according to some example techniques is given in FIG. 3. The illustrated method for processing a received multi-code code-division multiple-access (CDMA) signal is carried out by a wireless receiver, such as the GRAKE receiver illustrated in FIG. 2. The illustrated method is carried out for each of a plurality of observation time intervals and for each of one or more candidate spreading codes. These observation intervals may be transmission-time intervals (TTIs) as defined by the wireless communication system, for example, and are such that the code allocation is guaranteed to be constant during an observation interval, but may change from one observation interval to the next. An advantage of the techniques disclosed herein is that they provide for robust unused code detection within the span of one TTI, i.e., the same TTI in which the receiver processing that uses the impairment covariance is applied.

As shown at block 310, the illustrated method begins with determining a target detection sensitivity. In some embodiments, this may comprise the calculation of a signal power level at which level using the candidate spreading code in processing the received signal would degrade receiver performance by a pre-determined performance degradation level, given an estimate of received signal quality for the current observation time interval. Details of this calculation are provided below.

As shown at block 320, the illustrated method continues with the determination of a detection threshold τ, for use in detecting whether the candidate spreading code is unused in the received multi-code CDMA signal. In some embodiments, this is based on the target detection sensitivity and at least one of an estimate of received signal quality for the current observation time interval and an estimate of channel estimation quality. Again, details of the determination of the detection threshold τ are given below. However, in some embodiments, as explained in further detail below, the detection threshold may be fixed. For this reason, block 310 is depicted with a dashed outline, indicating that it is "optional," in the sense that it may not appear in every embodiment of the presently disclosed techniques or in every instance that the technique is carried out.

Skipping forward in FIG. 3 to block 350, it can be seen that detection of whether the candidate code is unused or not is carried out in a detection operation, using the detection parameter. More particularly, in some embodiments, this includes comparing an estimated signal power for the candidate spreading code to estimated noise and interference power corresponding to a spreading code that is known to be unused or corresponding to a spreading code that carries known symbol values, using the calculated detection threshold. As shown at block 360, whether or not the candidate spreading code is unused is then determined, based on said comparing. Once more, details of an example approach to this detection process are given below. Depending on the results, further receiver processing, such as impairment covariance estimation, is carried out either with or without the candidate code, as shown at blocks 370 and 380, respectively.

The process shown in FIG. 3 may be repeated for each of several observation time intervals and for each of several candidate codes. In each observation time interval, impairment covariance statistics can be estimated using noise and interference measurements corresponding to candidate spreading codes that are determined to be unused in the current observation time interval. In some embodiments, the estimated impairment covariance statistics are used to perform equalization of the received multi-code CDMA signal, or to perform interference suppression with respect to the received multi-code CDMA signal, or both In some embodiments, the detection process shown at blocks 350 and 360 is only selectively performed, based on an advance evaluation of whether the detection is likely to reliably detect an unused code. This is shown at blocks 330 and 340. In some embodiments, for instance, an achievable detection performance is estimated, as shown at block 330, based on the detection threshold and the estimated received signal quality for the current observation interval. Only if it is determined that the estimated achievable detection performance is better than a predetermined level, as shown at block 350, are the comparing and detecting operations shown at blocks 350 and 360 performed. In some embodiments, estimating the achievable detection performance comprises calculating a missed detection probability representing a probability that a spreading code that is unused is not detected as such. It will be appreciated that the steps of performance evaluation and choosing whether or not to perform the detection need not appear in every embodiment. For that reason, blocks 330 and 340 are shown with dashed outlines, indicating that these operations are "optional." In the event that these operations are not used, robustness is provided by proper selection of the detection parameter[s], e.g., the decision threshold τ.

Specific implementations of the processing blocks of FIG. 3 are detailed below.

Target Detection Sensitivity (Block 310)

The sensitivity of the detection process must allow the detection of code signal power at a sufficiently low level. That level is defined as one not causing significant performance degradation in the event that a used code with power at or under the target level is invoked in subsequent receiver processing. Enforcing this level ensures that a false detection of an unused code (i.e., incorrectly determining that a code is unused) will not degrade impairment covariance estimation to an excessive degree.

In some embodiments, the target detection sensitivity is defined as a code signal power above which the code would give rise to rank-1 terms in the impairment covariance matrix that would notably degrade weight computation for given channel estimation variance. It must be possible to reliably detect the code at the target detection sensitivity or, at a minimum, to avoid incorrectly determining that the code is unused when in fact the code is present at the target detection sensitivity level.

Denote the permissible false alarm probability (that is, the maximum probability with which an acceptable process may incorrectly indicate that a code is unused) by $P_{fa}$. An example false alarm probability might be 5% (0.05), for instance. The maximum permissible SINR degradation ratio, should a used code be invoked, is denoted by $\delta_{max}$. This maximum permissible degradation might be 0.5 dB, for example. Let an initial covariance estimate $R_u$ be available, e.g., created from CPICH symbols, together with a channel estimate vector $\hat{h}=h+e$, where h is the true channel vector and e is an estimation error vector having an estimation error covariance $R_e$.

If a code used for impairment covariance estimation is empty, the resulting weight solution $w_{unused}=R_u^{-1}\hat{h}$ yields a SINR for the signal of interest:

$$SINR_{unused} = \frac{|w_{unused}^H h|^2}{w_{unused}^H R_u w_{unused}}.$$

If, on the other hand, the code is not unused, but contains a signal component with chip-level power Ec/Ior=S, the weight solution becomes $w_{used}=R_d^{-1}\hat{h}$, instead, where $R_d=R_u+Shh^H$, and the resulting SINR for the signal of interest is $$SINR_{used} = \frac{|w_{used}^H h|^2}{w_{used}^H R_u w_{used}},$$

which is lower. Using the rank-1 update based on the Sherman-Morrison formula, we can write $w_{used}=w_{unused}-B\hat{h}$, where $$B = \frac{R_u^{-1} h h^H R_u^{-1}}{\frac{1}{S} + h^H R_u^{-1} h}.$$

Using these relationships, the loss in SINR due to a used code $$\delta = \frac{SINR_{used}}{SINR_{unused}}$$

may be evaluated as a function of the signal power fraction S. In a practical implementation, the true channel coefficients h are unknown, but the above analysis may be carried using the estimates ĥ. The channel estimation error variance for each coefficient may be analytically constructed or directly estimated and a diagonal $R_e$ matrix may be assumed. One possible technique is shown in co-pending U.S. patent application Ser. No. 13/679,064, by A. Reial et al., filed 16 Nov. 2012 and titled "Coefficient-Specific Filtering of Initial Channel Estimates," the entire contents of which are incorporated by reference. Other techniques may be used while still benefitting from the techniques disclosed herein, however.

In some embodiments, the instantaneous SINR values may be used to determine the instantaneous permissible S. In one embodiment, the SINR loss as a function of the signal power level may be analytically expressed via the expected SINR for the given channel response and over different channel estimation error realizations e. In one embodiment, the SINR loss or degradation may be computed as:

$$\delta(S) = \frac{E_e[SINR_{used}(S)]}{SINR_{unused}}$$

$$= \frac{(\hat{h}^H R_u^{-1} \hat{h})^2 + (\hat{h}^H B \hat{h})^2 + \hat{h}^H R_u^{-1} R_e R_u^{-1} \hat{h} + \hat{h}^H B R_e B \hat{h} - 2Re[\hat{h}^H R_u^{-1} \hat{h} \hat{h}^H B \hat{h} + \hat{h}^H R_u^{-1} R_e B \hat{h}]}{(\hat{h}^H R_u^{-1} \hat{h}) \left( \begin{array}{c} \hat{h}^H R_u^{-1} \hat{h} + \hat{h}^H B R_u B \hat{h} + tr[LR_u^{-1} R_e R_u^{-1} L^H] + \\ tr[LBR_e BL^H] - 2Re[\hat{h}^H B \hat{h} + tr[LR_u^{-1} R_e BL^H]] \end{array} \right)}$$

where $R_u = L^H L$.

Figure 4:
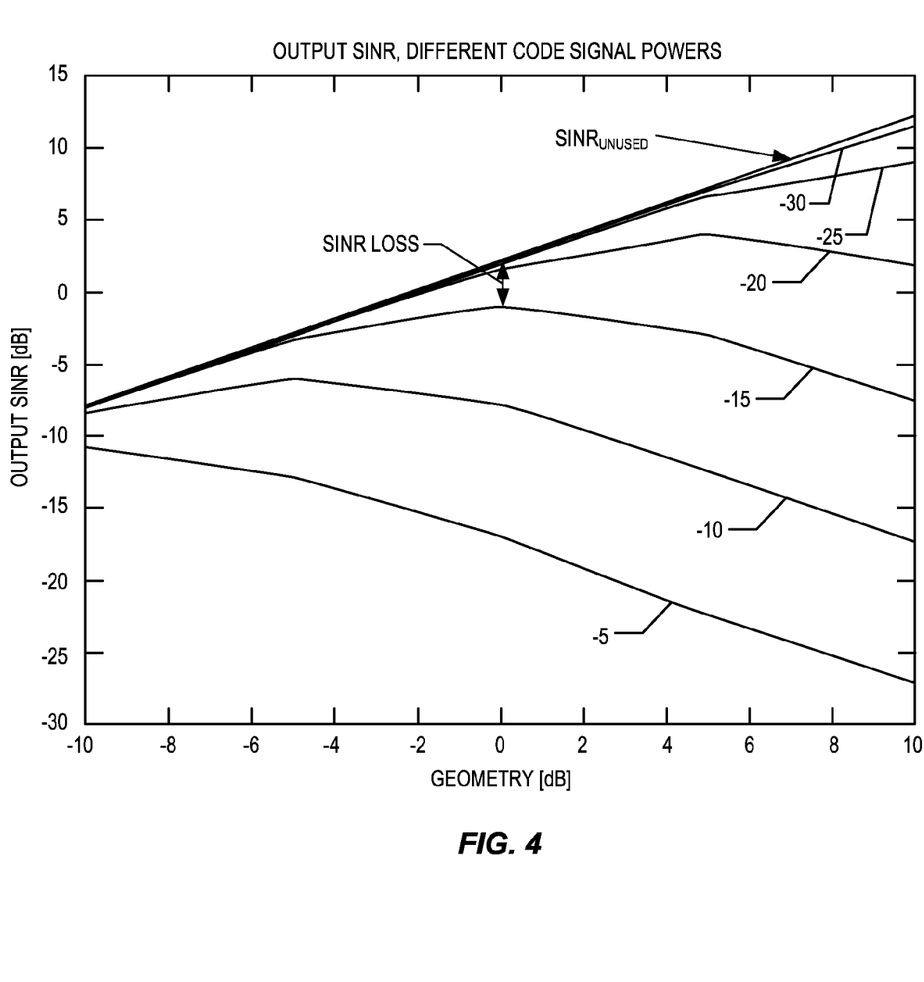
FIG. 4 illustrates output signal-to-interference-plus-noise ratio (SINR) versus channel realization, for scenarios in which a spreading code at each of several code powers is used in impairment covariance estimation.

FIG. 4 plots $SINR_{used}$ versus channel geometry, for each of several different signal code powers, ranging from −5 dB to −30 dB relative to the total base station signal power, where $SINR_{used}$ represents the SINR for the signal of interest that is achieved in the event that a code is incorrectly determined to be unused and is incorporated into the impairment covariance estimate. Note that "geometry" is defined as the ratio of total base station signal power to interference-plus-noise at the receiver. The SINR that results if an unused code is correctly identified, $SINR_{unused}$, is also given. It will be appreciated that an "SINR loss" can be determined, for any given geometry, by evaluating the difference between $SINR_{unused}$ and $SINR_{used}$. Accordingly, for a given permissible SINR loss, the maximal code signal power S that will produce that SINR loss, i.e., the maximal value S resulting in $\delta(S) < \delta_{max}$, can be determined. This maximal value S can be used for subsequent parameter definition.

In some embodiments, the SINR loss may be pre-computed for different combinations of signal powers, channel estimate filtering span $N_{avg}$ (which predominantly determines the scaling of $R_e$ in HSPA systems), and SINR. While the SINR loss naturally changes slightly, depending on the delay profile or other-cell interference, for example, the behavior is primarily determined by, and may be well parameterized using, the overall SINR operating point. The values for SINR loss may be obtained as expectations over different channel responses and estimation error realizations and tabulated as $\delta = F_1 (S, N_{avg}, SINR_{unused})$ or, preferably, its inverse $S = F_2 (\delta, N_{avg}, SINR_{unused})$. The permissible value S can then be retrieved from the table.

The allowed degradation ratio $\delta_{max}$ and false alarm probability $P_{fa}$ may be determined in advance, in some embodiments, e.g., via computer simulations. In some embodiments, they may depend on the SINR operating point.

In yet other embodiments, the SINR loss may be quantified by using CPICH symbol-based covariance estimates. Consider a CPICH-based SINR estimate $$SINR_{CPICH}(S) = \frac{|w_{CPICH}^H(S) h|^2}{w_{CPICH}^H(S) R_{u,CPICH}(S) w_{CPICH}(S)},$$

where $$R_{u,CPICH}(S) = \frac{1}{N} \sum_{n=1}^{N} (x_{CPICH} - \gamma h s_{CPICH})(x_{CPICH} - \gamma h s_{CPICH})^H,$$

with $$\gamma = 1 - \frac{S}{E_p / I_{or}}$$

and $w_{CPICH}(S) = R_{u,CPICH}^{-1}(S) h$. Here, $x_{CPICH}$ are column vectors containing the despread CPICH symbol estimates. The quantity $E_p/I_{or}$ corresponds to the power fraction allocated to CPICH by the base station, and may be reliably estimated from long-term averaged measurements. The value of γ determines the strength of the residual signal component, emulating a used code. The traditional CPICH-based covariance estimate is based on removing the entire CPICH signal component, S=0 and γ=1. By removing only a fraction of the CPICH signal component prior to covariance estimation, γ<1, different levels of effective used code contributions may be emulated and the corresponding SINR loss quantified as $$\delta(S) = \frac{SINR_{CPICH}(S)}{SINR_{CPICH}(0)},$$

where SINR(0) is the value of $SINR_{CPICH}(S)$, as given above, evaluated at S=0. The value of S leading to the acceptable $\delta_{max}$ is then used for setting detection parameters. Note that while the CPICH-based covariance estimate often does not lead to high-quality weights, the relative SINR loss may be estimated with high accuracy nevertheless.

In some embodiments, the target detection sensitivity may depend on the transport format that a particular UE is scheduled to use. Since the sensitivity to the combined SINR loss depends on the scheduled transport format, the permissible SINR loss $\delta_{max}$ may be smaller for low code-rate transport formats and larger for high-rate formats. Optionally, the current cell geometry (ratio of received own-cell power to received other-cell and noise power) estimate, or current symbol SINR estimate, may be used in combination with the transport format info to adapt the $\delta_{max}$. If the actual SINR is higher than the required SINR for decoding the given transport format, the permissible SINR loss $\delta_{max}$ may be increased.

Detection Parameters (Block 320)

In some embodiments, as discussed above, the target detection sensitivity for a given scenario consists of the signal power level S, at which a predetermined false alarm probability threshold $P_{fa}$ must be achieved, where the false-alarm probability threshold indicates a maximum probability that a spreading code is incorrectly determined to be unused. In some embodiments, the detection parameter may then be defined as the decision threshold $\tau$ that can be applied in a subsequent decision process to detect that a given code is not used, with false alarms (incorrect determinations that a code is unused) occurring at a rate no higher than the specified false alarm probability, for the signal level S. In other words, the detection threshold may be determined, by calculating, based on the estimate of received signal quality for the current observation time interval, a signal power level at which level using the candidate spreading code in processing the received signal would degrade receiver performance by a pre-determined performance degradation level, and then determining the detection threshold based on the calculated signal power level and the false-alarm probability threshold. The appropriate threshold $\tau$ may be found, in some embodiments, from pre-computed tables describing the false alarm performance $P_{fa}$ for different combinations of signal power levels S and threshold values $\tau$.

In some embodiments, the detection parameters may be set additionally based on the available processing resources, signal conditions, etc. In yet other embodiments, the detection parameters may be fixed. In these embodiments, the robustness must be enforced by other mechanisms. Examples of this approach are described below, in connection with the description of FIG. 5.

Achievable Detection Performance and Comparing to Target (Blocks 330 and 340)

As shown at block 330, the achievable detection quality with the chosen parameters under current conditions can be estimated. If the achievable quality is sufficient according to some criterion (block 340), the unused code test is performed.

In some embodiments, the detection parameters are defined as the decision threshold $\tau$ that leads to the desired false alarm probability $P_{fa}$. The actual achievable detection performance may then be characterized by the corresponding missed detection probability $P_{md}$, i.e., the probability that a code that is actually unused is not detected as such. If the anticipated $P_{md}$ is high, the actual unused code test may be omitted. The step of checking the achievable performance may be seen as a complexity reduction measure.

In some embodiments, the operations shown in blocks 330 and 340 are omitted and the test for unused codes is performed in all cases. In conditions where only low achievable performance (high $P_{md}$) is possible, the test is simply less likely to identify an unused code signal, even if such codes exist.

Unused Code Detection (Blocks 350, 360)

The noise-plus-interference power on a first code that is known to be empty or that has known contents (e.g. P-CPICH) is first estimated. Corresponding noise-plus-interference power on a second code (the candidate code) is then estimated. If these two codes have different spreading factors, then one or both power estimates are compensated for the spreading factor difference. The (compensated) power estimates are then compared, e.g., by calculating a ratio between them. If the ratio is below a threshold, the second code is declared unused. Fast unused code detection is possible, since the expectation of the (compensated) impairment power during a given observation window (e,g, the same TTI) on the first and second codes is equal.

Reference and candidate code cymbol generation: We start with the traditional DS-CDMA processing. Denote the sequence of de-spread and combined symbols from the first (reference) code by $p_1^{(1)}, p_2^{(1)}, \ldots p_{K_1}^{(1)}$. The de-spread and combined symbols from the second (candidate) code are denoted by $r_1^{(2)}, r_2^{(2)}, \ldots r_{K_2}^{(2)}$. Preferably, combining is performed using some form of equalizing receiver (e.g., a GRAKE or a chip equalizer), since maximizing the symbol SINR also maximizes unused code detection performance. In other embodiments, a RAKE receiver or even a single de-spread value corresponding to the strongest channel tap may be used.

If the first code is a known non-empty code, the known contents values $a_k^{(1)}$ are subtracted to produce the reference impairment samples: $r_k^{(1)} = p_k^{(1)} - a_k^{(1)}$. Approaches well-known in the art may be used for estimating and applying the appropriate scaling for the contents values $a_k^{(1)}$. If the first code is a known empty code, we let $r_k^{(1)} = p_k^{(1)}$.

Note that the values $r_k^{(2)}$ generally represent noisy QPSK or PAM symbol estimates.

Reference and candidate code symbol variance estimation: Next, the sample variances of the first and second de-spread symbol impairment estimates are estimated. The first sample variance $v_1$ is a reference sample variance, for the series of de-spread symbol impairment estimates corresponding to the spreading code that is known to be unused or that carries known symbol values, while the second sample variance $v_2$ is a test sample variance for a series of de-spread symbol impairment estimates corresponding to the candidate unused spreading code:

$$v_1 = \frac{1}{N_1 - 1} \sum_{n=1}^{K_1} |r_n^{(1)}|^2$$

$$v_2 = \frac{1}{N_2 - 1} \sum_{n=1}^{K_2} |r_n^{(2)}|^2.$$

Note that since $|r_n^{(m)}|^2 = [\text{Re}(r_n^{(m)})]^2 + [\text{Im}(r_n^{(m)})]^2$, the variance estimates are based on $2K_m$ real samples per code, $m=1,2$, where $m=1$ indices the reference code and $m=2$ indices the candidate code.

Code detection: The spreading factor-compensated ratio between the first and second variance (power) metrics is compared to the detection threshold, $\tau$:

$$\frac{w_2}{w_1} \leq \tau ?,$$

where $$w_m = \frac{v_m}{SF_m},$$

$m=1,2$, i.e., the sample variance, $v$, compensated by the spreading factor, SF, of the corresponding code. If the ratio does not exceed the detection threshold, the second code is declared as unused. Otherwise, it is declared as used.

Note that it is assumed that the symbol estimates for the first and second codes were not additionally scaled, and in particular, were not already compensated for the difference in spreading factors. If such compensation takes place in the processing chain, the ratio metric is modified in an obvious manner.

Unused Code Detection Performance

The performance of the approach for detecting the unused/used state of one HS-PDSCH code (SF=16) by comparing to reference codes with different SFs (SF=256, 128, and 64) has been evaluated. Detection performance depends on the estimation variances of the metrics $w_1$ and $w_2$, which in turn depend on the sample size for each of the codes ($2K_m$ samples, where $$K_m = \frac{3 \cdot 2560}{SF_m}$$

if the observation interval equals 1 TTI (for 3 slots, 2560 chips each) in HSDPA). The approach allows reliable detection of used codes with per-code power allocation as a fraction of the total base station power (Ec/Ior) as low as −23 dB, using a single SF256 code (e.g., CPICH) as a reference code. Even higher discrimination is achieved if higher-SF reference codes (or several SF256 codes) are available. Operating at a lower geometry (SINR), the low-power used codes are somewhat more difficult to distinguish. Still, at SINR=0 dB, used code with QPSK and Ec/Ior>−13 dB is reliably detected.

Example of Target Detection Sensitivity and Detection Parameters

Consider a scenario where $SINR_{unused}=0$ dB, the channel estimates are filtered over 1 slot, the required false-alarm probability $P_{fa}=0.05$, with a maximum degradation of the SINR $\delta_{max}=-0.5$ dB. Assume that a pre-computed table $S=F_2(\delta, N_{avg}, SINR_{unused})$ is available and returns $F_2(-0.5$ dB, 10 sym, 0 dB)=−20 dB.

We now use the target detection level Ec/Ior=−20 dB to find the required detection threshold τ so that the $P_{fa}=0.05$, using pre-computed results. The threshold for mean symbol estimate power thus becomes τ=9.3 dB.

Assume that only a single SF256 code is available. For the chosen threshold, the resulting missed-detection probability $P_{md}=0.28$. In other words, 72% of the available unused codes will be detected with this configuration. If the unused code testing is activated adaptively, it should certainly be activated in this situation.

Alternative Embodiment Using Fixed Detection Parameters

Figure 5:
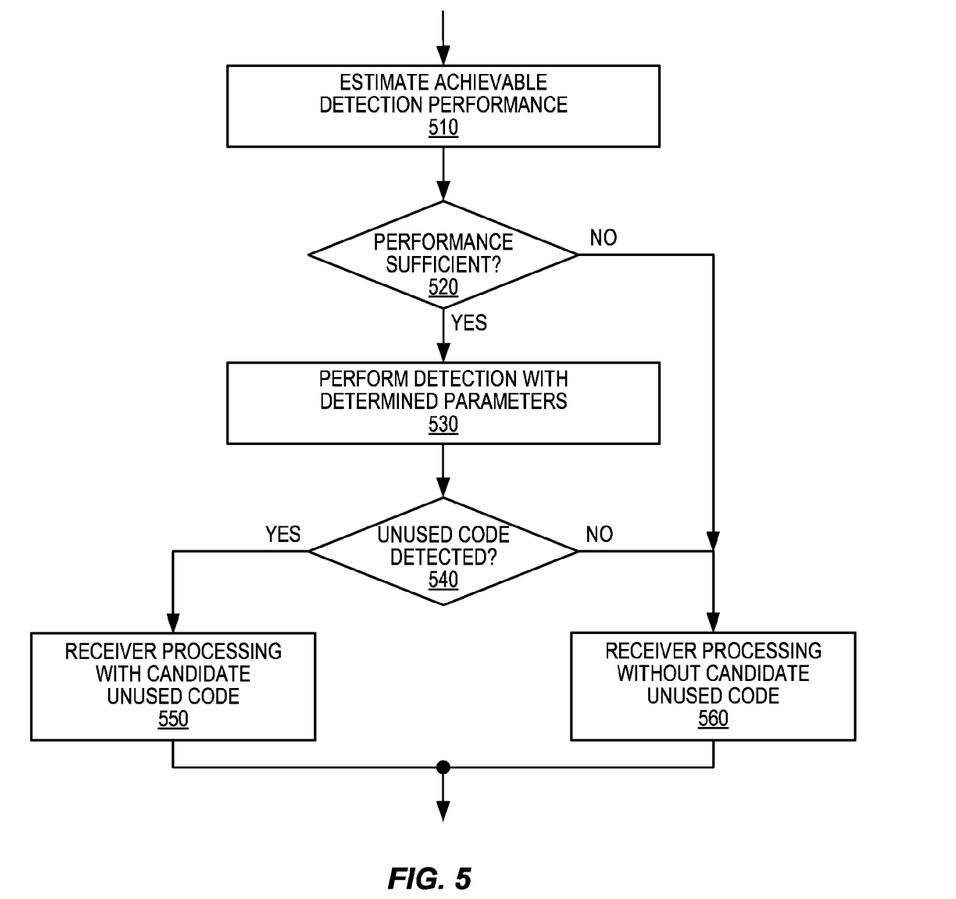
FIG. 5 is a process flow diagram illustrating another example method for processing a received multi-code code-division multiple-access (CDMA) signal to detect unused spreading codes.

In some embodiments, the detection parameters may be fixed, i.e., not dynamically determined. In this case, the steps of performance evaluation and test of acceptability constitute the robustness mechanism. The resulting flow diagram for the process is slightly modified, as shown in FIG. 5.

The process begins, as shown at block 510, with estimating an achievable performance level for detecting whether a candidate spreading code is unused in the received multi-code CDMA signal, based on a predetermined detection threshold and an estimate of received signal quality for the current observation time interval. Note that a fixed detection threshold typically leads to a fixed missed-detection probability $P_{md}$. In some embodiments, then, the estimated achievable performance level is an estimated false-alarm probability $P_{fa}$, which indicates a maximum probability that a spreading code is incorrectly determined to be unused.

Detection performance is thus evaluated in terms of the achievable $P_{fa}$. As shown at block 520, the achievable $P_{fa}$ is evaluated, e.g., by comparing the estimated achievable performance level to a predetermined performance level to determine whether the estimated achievable performance level is better than the predetermined performance level. The unused code test, i.e., detecting whether the candidate spreading code is unused, is only selectively performed, based on this comparing. For instance, the unused code test is performed only if the $P_{fa}$ is sufficiently low.

If the estimated achievable performance level exceeds a predetermined criterion, e.g. the achievable $P_{fa}$ is below a predetermined threshold that indicates a sufficiently good performance level, then the unused code test is carried out, as shown at block 530, e.g., by comparing an estimated signal power for the candidate spreading code to estimated noise and interference power corresponding to a spreading code that is known to be unused or corresponding to a spreading code that carries known symbol values, using the predetermined detection threshold. More particularly, this comparing, in some embodiments, comprises estimating a reference sample variance for a series of de-spread impairment estimates corresponding to the spreading code that is known to be unused or that carries known symbol values, estimating a test sample variance for a series of de-spread impairment estimates corresponding to the candidate spreading code, calculating a ratio between the test sample variance and the reference sample variance, and comparing the ratio to the detection threshold. In some embodiments, calculating this ratio includes compensating the ratio for a difference in spreading factors corresponding to the candidate spreading code and the spreading code that is known to be unused or that carries known symbol values.

As shown at block 540, whether or not the candidate spreading code is unused is detected, based on said comparing. For example, when a ratio between a test sample variance and a reference sample variance is computed in the manner described above, then a ratio less than the detection threshold indicates that the candidate spreading code is unused. Of course an inverse ratio might be computed instead, in which case a ratio greater than the detection threshold indicates that the candidate spreading code is unused.

Depending on the results, further receiver processing, such as impairment covariance estimation, is carried out either with or without the candidate code, as shown at blocks 550 and 560, respectively. The process shown in FIG. 5 may be repeated for each of several observation time intervals and for each of several candidate codes. In each observation time interval, impairment covariance statistics can be estimated using noise and interference measurements corresponding to candidate spreading codes that are determined to be unused in the current observation time interval.

Figure 6:
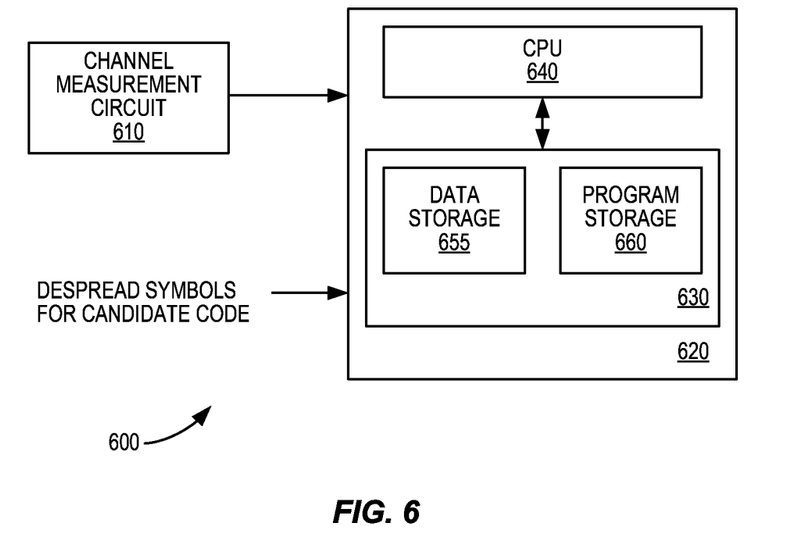
FIG. 6 is a block diagram illustrating components of an example wireless receiver.

The techniques illustrated in FIGS. 3 and 5, and all of the variants discussed above, can be implemented in a wireless or communications receiver having the functional components illustrated in FIG. 2 in one example. Various types of devices may include such a receiver, including UEs or other mobile terminals, smartphones, wireless-enabled tablet computers or laptop computers, etc. FIG. 6 is a block diagram of one example implementation of a receiver circuit 600 configured according to the present invention. It will be appreciated that receiver circuit 600 can likewise be adapted to carry out any of the techniques illustrated in FIGS. 3 and 5, and variants of those techniques.

Receiver circuit 600 includes a channel response measurement circuit 610, which is configured to perform a plurality of channel response measurements corresponding to a path delay or to a signal frequency, or both, to obtain an estimated channel response vector ĥ for the current observation time interval. In general terms, measurement circuit 610 is configured to compare samples derived from the received signal to the known transmitted signal to obtain these channel measurement samples. In some embodiments, measurement circuit 610 comprises one or more receiver "taps," or correlators, which are arranged to de-spread a received CDMA signal using a known channelization code and/or scrambling code, to obtain de-spread samples of a pilot signal having known symbol values. The ratio of each de-spread sample to the corresponding known symbol values represents a channel response measurement.

The estimated channel response vector $\hat{h}$ is supplied to processing circuit 620, along with de-spread symbols corresponding to each of one or more candidate codes. Processing circuit 620 is configured to receive the channel measurements from measurement circuit 610 and the de-spread symbols for the candidate code(s), and to evaluate them according to one or more of the techniques described above to detect whether each code is unused. Accordingly, processing circuit 620 in some embodiments is configured to determine a detection threshold for use in detecting whether the candidate spreading code is unused in the received multi-code CDMA signal, based on at least one of an estimate of received signal quality for the current observation time interval and an estimate of channel estimation quality and based on a target detection quality, to compare an estimated signal power for the candidate spreading code to estimated noise and interference power corresponding to a spreading code that is known to be unused or corresponding to a spreading code that carries known symbol values, using the calculated detection threshold, and to detect whether the candidate spreading code is unused, based on said comparing. In other embodiments, processing circuit 620 may be configured slightly differently, in that it uses a fixed detection threshold. More particularly, processing circuit 620 in these embodiments may be configured to estimate an achievable performance level for detecting whether a candidate spreading code is unused in the received multi-code CDMA signal, based on a predetermined detection threshold and an estimate of received signal quality for the current observation time interval, and to compare the estimated achievable performance level to a predetermined performance level to determine whether the estimated achievable performance level is better than the predetermined performance level. Responsive to determining that the estimated achievable performance level is better than the predetermined performance level, the processing circuit 620 in these embodiments compares an estimated signal power for the candidate spreading code to estimated noise and interference power corresponding to a spreading code that is known to be unused or corresponding to a spreading code that carries known symbol values, using the calculated detection threshold, and detects whether the candidate spreading code is unused, based on said comparing. In any of these embodiments, the processing circuit 620 may be further configured to, for each observation time interval, estimate impairment covariance statistics using noise and interference measurements corresponding to candidate spreading codes that are determined to be unused in the current observation time interval and to use the estimated impairment covariance statistics to perform equalization of the received multi-code CDMA signal, or to perform interference suppression with respect to the received multi-code CDMA signal, or both.

Processing circuit 620 includes a central-processing unit (CPU) 640, which may comprise one or more microprocessors, microcontrollers, and/or the like, coupled to memory unit 630. Memory unit 630, which may comprise one or several types of memory such as RAM, ROM, Flash, optical storage devices, magnetic storage devices, and the like, stores computer program instructions 660 for execution by CPU 640, and stores program data 655. Program instructions 660 include instructions for carrying out one or more of the techniques described above.

It will be appreciated by those familiar with receiver circuit design that the partitioning of functionality between the measurement circuit 610 and processing circuit 620 as described above is but one example. In other embodiments, for example, part of the channel estimation functionality might be carried out by processing circuit 620. Accordingly, while the illustrated processing circuit 620 is one example of a processing circuit, the term "processing circuit" should be understood to refer to any suitable combination of digital hardware, microcontrollers, microprocessors, and/or memory.

The techniques disclosed herein allow robust, fast detection of unused codes, using a limited observation period, such as one transmit-time interval (TTI). Best-effort detection is enabled, while performance degradation arising from erroneous decisions is limited to an arbitrarily low level. The tradeoff between missed detections and false alarms may be tuned as desired. The possibility of robust, fast detection as enabled by the presently disclosed techniques may encourage communications systems designers to deliberately leave one or more codes, such as HS-PDSCH codes in a UMTS system, unused in some scenarios, for impairment estimation purposes.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:
1. A method, in a wireless receiver, for processing a received multi-code code-division multiple-access (CDMA) signal, the method comprising, for each of a plurality of observation time intervals and for each of one or more candidate spreading codes:
    calculating a detection threshold for use in detecting whether the candidate spreading code is unused in the received multi-code CDMA signal, based on a target detection sensitivity and at least one of an estimate of received signal quality for the current observation time interval and an estimate of channel estimation quality,
    wherein the target detection sensitivity is a code signal power level representing a target sensitivity for detecting whether candidate spreading codes are being used,
    wherein the target detection sensitivity is determined by calculating, based on the estimate of received signal quality for the current observation time interval, a signal power level at which level using the candidate spreading code in processing the received signal would degrade receiver performance by a pre-determined performance degradation level, and
    wherein the detection threshold is determined based on the calculated signal power level and a false-alarm probability threshold indicating a maximum probability that a spreading code is incorrectly determined to be unused;
comparing an estimated signal power for the candidate spreading code to estimated noise and interference power corresponding to a spreading code that is known to be unused or corresponding to a spreading code that carries known symbol values, using the calculated detection threshold; and
detecting whether the candidate spreading code is unused, based on said comparing.

2. The method of claim 1, further comprising, for each observation time interval, estimating impairment covariance statistics using noise and interference measurements corresponding to candidate spreading codes that are determined to be unused in the current observation time interval.

3. The method of claim 2, further comprising using the estimated impairment covariance statistics to perform equalization of the received multi-code CDMA signal, or to perform interference suppression with respect to the received multi-code CDMA signal, or both.

4. The method of claim 1, wherein calculating the detection threshold based on the calculated signal power level and the false-alarm probability threshold comprises retrieving the detection threshold from a pre-computed lookup table indexed by the calculated signal power level and the false-alarm probability threshold.

5. The method of claim 1, wherein calculating the detection threshold is further based on available processing resources.

6. The method of claim 1, further comprising, for each of the plurality of observation time intervals, estimating an achievable performance level for detecting whether a candidate spreading code is unused, based on the detection threshold and the estimated received signal quality, wherein said comparing and said detecting are performed in response to determining that the estimated achievable performance level is better than a predetermined level.

7. The method of claim 6, wherein estimating the achievable performance level comprises calculating a missed detection probability representing a probability that a spreading code that is unused is not detected as such, and wherein said comparing and said detecting are performed in response to determining that the missed detection probability falls below a predetermined level.

8. The method of claim 1, wherein comparing the estimated signal power for the candidate spreading code to estimated noise and interference power corresponding to a spreading code that is known to be unused or corresponding to a spreading code that carries known symbol values comprises:
estimating a reference sample variance for a series of de-spread symbol impairment estimates corresponding to the spreading code that is known to be unused or that carries known symbol values;
estimating a test sample variance for a series of de-spread symbol impairment estimates corresponding to the candidate spreading code;
calculating a ratio between the test sample variance and the reference sample variance; and
comparing the ratio to the detection threshold;
wherein a ratio less than the detection threshold indicates that the candidate spreading code is unused.

9. The method of claim 8, wherein calculating the ratio between the test sample variance and the reference sample variance comprises compensating the ratio for a difference in spreading factors corresponding to the candidate spreading code and the spreading code that is known to be unused or that carries known symbol values.

10. A method, in a wireless receiver, for processing a received multi-code code-division multiple-access (CDMA) signal, the method comprising, for each of a plurality of observation time intervals and for each of one or more candidate spreading codes:
estimating an achievable performance level for detecting whether a candidate spreading code is unused in the received multi-code CDMA signal, based on a predetermined detection threshold and an estimate of received signal quality for the current observation time interval, wherein the estimated achievable performance level comprises an estimated false-alarm probability indicating a maximum probability that a spreading code is incorrectly determined to be unused;
comparing the estimated achievable performance level to a predetermined performance level for detecting whether a candidate spreading code is unused to determine whether the estimated achievable performance level is better than the predetermined performance level, wherein determining that the estimated achievable performance level is better than the predetermined performance level comprises determining that the estimated false-alarm probability is less than a predetermined false-alarm probability threshold; and
responsive to determining that the estimated achievable performance level is better than the predetermined performance level, comparing an estimated signal power for the candidate spreading code to estimated noise and interference power corresponding to a spreading code that is known to be unused or corresponding to a spreading code that carries known symbol values, using the predetermined detection threshold and detecting whether the candidate spreading code is unused, based on said comparing.

11. The method of claim 10, further comprising, for each observation time interval, estimating impairment covariance statistics using noise and interference measurements corresponding to candidate spreading codes that are determined to be unused in the current observation time interval.

12. The method of claim 10, wherein comparing the estimated signal power for the candidate spreading code to estimated noise and interference power corresponding to a spreading code that is known to be unused or corresponding to a spreading code that carries known symbol values comprises:
estimating a reference sample variance for a series of de-spread impairment estimates corresponding to the spreading code that is known to be unused or that carries known symbol values;
estimating a test sample variance for a series of de-spread impairment estimates corresponding to the candidate spreading code;
calculating a ratio between the test sample variance and the reference sample variance; and
comparing the ratio to the detection threshold;
wherein a ratio less than the detection threshold indicates that the candidate spreading code is unused.

13. The method of claim 12, wherein calculating the ratio between the test sample variance and the reference sample variance comprises compensating the ratio for a difference in spreading factors corresponding to the candidate spreading code and the spreading code that is known to be unused or that carries known symbol values.

14. A receiver circuit comprising:
a channel response estimation circuit configured to estimate a channel response vector for a received multi-code code-division multiple-access (CDMA) signal,
correlation and combining circuits configured to obtain de-spread symbols corresponding to candidate unused spreading codes, from the received multi-code CDMA signal, and
a processing circuit configured to, for each of a plurality of observation time intervals:
calculate a detection threshold for each candidate spreading code, for use in detecting whether the candidate spreading code is unused in the received multi-code CDMA signal, based on a target detection sensitivity and at least one of an estimate of received signal quality for the current observation time interval and an estimate of channel estimation quality,
wherein the target detection sensitivity is a code signal power level representing a target sensitivity for detecting whether candidate spreading codes are being used,
wherein the target detection sensitivity is determined by calculating, based on the estimate of received signal quality for the current observation time interval, a signal power level at which level using the candidate spreading code in processing the received signal would degrade receiver performance by a pre-determined performance degradation level,
wherein the detection threshold is determined based on the calculated signal power level and a false-alarm probability threshold indicating a maximum probability that a spreading code is incorrectly determined to be unused;
compare an estimated signal power for each candidate spreading code to estimated noise and interference power corresponding to a spreading code that is known to be unused or corresponding to a spreading code that carries known symbol values, using the calculated detection threshold; and
detect whether each candidate spreading code is unused, based on said comparing.

15. The receiver circuit of claim 14, wherein the processing circuit is further configured to estimate impairment covariance statistics for each of the plurality of observation time intervals, using noise and interference measurements corresponding to candidate spreading codes that are determined to be unused in the corresponding observation time interval.

16. The receiver circuit of claim 15, wherein the processing circuit is further configured to use the estimated impairment covariance statistics to perform equalization of the received multi-code CDMA signal, or to perform interference suppression with respect to the received multi-code CDMA signal, or both.

17. The receiver circuit of claim 14, wherein the processing circuit is further configured to estimate an achievable performance level for detecting whether a candidate spreading code is unused for each of the plurality of observation time intervals, based on the detection threshold and the estimated received signal quality, and to perform said comparing and said detecting for each observation time interval in response to determining that the estimated achievable performance level is better than a predetermined level.

18. The receiver circuit of claim 14, wherein the processing circuit is configured to compare the estimated signal power for the candidate spreading code to estimated noise and interference power corresponding to a spreading code that is known to be unused or corresponding to a spreading code that carries known symbol values by:
estimating a reference sample variance for a series of de-spread symbol impairment estimates corresponding to the spreading code that is known to be unused or that carries known symbol values;
estimating a test sample variance for a series of de-spread symbol impairment estimates corresponding to the candidate spreading code;
calculating a ratio between the test sample variance and the reference sample variance; and
comparing the ratio to the detection threshold;
wherein a ratio less than the detection threshold indicates that the candidate spreading code is unused.

19. A receiver circuit comprising:
a channel response estimation circuit configured to estimate a channel response vector for a received multi-code code-division multiple-access (CDMA) signal,
correlation and combining circuits configured to obtain de-spread symbols corresponding to candidate unused spreading codes, from the received multi-code CDMA signal, and
a processing circuit configured to, for each of a plurality of observation time intervals:
estimate an achievable performance level for detecting whether a candidate spreading code is unused in the received multi-code CDMA signal, based on a pre-determined detection threshold and an estimate of received signal quality for the current observation time interval, wherein the estimated achievable performance level comprises an estimated false-alarm probability indicating a maximum probability that a spreading code is incorrectly determined to be unused;
compare the estimated achievable performance level to a predetermined performance level for detecting whether a candidate spreading code is unused to determine whether the estimated achievable performance level is better than the predetermined performance level, wherein determining that the estimated achievable performance level is better than the predetermined performance level comprises determining that the estimated false-alarm probability is less than a predetermined false-alarm probability threshold; and
responsive to determining that the estimated achievable performance level is better than the predetermined performance level, compare an estimated signal power for the candidate spreading code to estimated noise and interference power corresponding to a spreading code that is known to be unused or corresponding to a spreading code that carries known symbol values, using the predetermined detection threshold and detecting whether the candidate spreading code is unused, based on said comparing.

20. The receiver circuit of claim 19, wherein the processing circuit is further configured to estimate impairment covariance statistics for each of the plurality of observation time intervals, using noise and interference measurements corresponding to candidate spreading codes that are determined to be unused in the corresponding observation time interval.

21. The receiver circuit of claim 20, wherein the processing circuit is further configured to use the estimated impairment covariance statistics to perform equalization of the received multi-code CDMA signal, or to perform interference suppression with respect to the received multi-code CDMA signal, or both.

22. A wireless device comprising the receiver circuit of claim 14.

* * * * *